US012811281B2

(12) United States Patent
Siguier et al.

(10) Patent No.: US 12,811,281 B2
(45) Date of Patent: Nov. 24, 2026

(54) DEVICE FOR ACTIVATING A VEHICLE FUNCTION IN THE NEAR FIELD AND IN THE ULTRA-WIDE BAND

(71) Applicant: Continental Automotive Technologies GmbH, Hannover (DE)

(72) Inventors: Grégory Siguier, Miremont (FR); Sylvain Godet, Villeneuve-lès-Bouloc (FR); Stéphane Billy, Grenade (FR)

(73) Assignee: CONTINENTAL AUTOMOTIVE TECHNOLOGIES GMBH, Hanover (DE)

( * ) Notice: Subject to any disclaimer, the term of this patent is extended or adjusted under 35 U.S.C. 154(b) by 0 days.

(21) Appl. No.: 19/318,269

(22) Filed: Sep. 3, 2025

(65) Prior Publication Data

US 2026/0066528 A1 Mar. 5, 2026

(30) Foreign Application Priority Data

Sep. 4, 2024 (FR) .................................. FR2409375

(51) Int. Cl.
*H01Q 1/32* (2006.01)
*B60R 25/24* (2013.01)
(Continued)

(52) U.S. Cl.
CPC ......... *H01Q 1/3241* (2013.01); *B60R 25/245* (2013.01); *H01Q 1/3283* (2013.01);
(Continued)

(58) Field of Classification Search
CPC ...... H01Q 1/3241; H01Q 1/3283; H01Q 5/25; H01Q 7/00; H01Q 9/285; H01Q 1/36;
(Continued)

(56) References Cited

U.S. PATENT DOCUMENTS 7,158,033 B2 * 1/2007 Forster ..................... H01Q 5/40 340/572.1
2015/0254548 A1 * 9/2015 Ikemoto ............... H01Q 1/2225 235/492

(Continued)

FOREIGN PATENT DOCUMENTS

FR 3143486 A1 6/2024

OTHER PUBLICATIONS

Written Opinion on the Patentability of the Invention and Preliminary Research Report with machine translation mailed on Feb. 19, 2025 by the French Patent Office in corresponding French Patent Application No. FR2409375. (10 pages).

*Primary Examiner* — Michael M Bouizza
(74) *Attorney, Agent, or Firm* — Buchanan Ingersoll & Rooney PC

(57) ABSTRACT

A device for activating a vehicle function in the near field and in the ultra-wide band, for installation on a motor vehicle, including: an antenna consisting of a plurality of discontinuous windings having two junction zones forming a first antenna part and a second antenna part; near-field communication controller of the antenna; a first connection between the windings of the two antenna parts, including at least one inductor; the near-field communication controller of the antenna and the first connection and the two antenna parts forming a near-field communication antenna; ultra-wide band communication controller of the antenna; a second connection between the windings of one and the same antenna part, including at least one capacitor; the controller of the ultra-wide band antenna, the connection and the two antenna parts forming an ultra-wide band dipole antenna, the activation device communicating in the near field and in the ultra-wide band simultaneously.

9 Claims, 2 Drawing Sheets

(51) Int. Cl.
*H01Q 5/25* (2015.01)
*H01Q 7/00* (2006.01)
*H01Q 9/28* (2006.01)

(52) U.S. Cl.
CPC ................. *H01Q 5/25* (2015.01); *H01Q 7/00* (2013.01); *H01Q 9/285* (2013.01); *B60R 2325/101* (2013.01)

(58) Field of Classification Search
CPC ............ H01Q 1/325; H01Q 1/50; H01Q 5/50; H01Q 21/00; B60R 25/245; B60R 2325/101; H04B 5/70; H04B 5/43; H04B 5/40
See application file for complete search history.

(56) References Cited

U.S. PATENT DOCUMENTS

| | | | | |
|---|---|---|---|---|
| 2018/0312137 | A1* | 11/2018 | Neuhoff ............... | H01Q 1/3241 |
| 2021/0370877 | A1* | 12/2021 | Peterson ............... | B60R 16/023 |
| 2024/0087442 | A1 | 3/2024 | Thirumalaisamy et al. | |
| 2024/0198959 | A1 | 6/2024 | Buchmeier et al. | |

* cited by examiner

DEVICE FOR ACTIVATING A VEHICLE FUNCTION IN THE NEAR FIELD AND IN THE ULTRA-WIDE BAND

CROSS-REFERENCE TO RELATED APPLICATIONS

This application claims priority to FR2409375, filed Sep. 4, 2024, the contents of such application being incorporated by reference herein

FIELD OF THE INVENTION

The invention relates to a device for activating a vehicle function in the near field and in the ultra-wide band, installed on board a motor vehicle. The invention particularly applies to activation devices located in a door or a door jamb of a vehicle, preferentially in the door handle, which make it possible to locate, communicate with and thus authenticate a hands-free access device, of the fob or smartphone type, in a near area around the vehicle in order to unlock the opening elements of the vehicle without a physical key.

BACKGROUND OF THE INVENTION

In a motor vehicle, it is known practice to use vehicle function activation devices that are able to detect the presence of a hand or a foot of a user of the vehicle and thus allow all or some of the opening elements of the vehicle, for example the doors or the trunk, to be locked or unlocked. By way of example, the detection of the presence of a hand of a user on or in front of a door handle coupled with the recognition of an identifier of a “hands-free” access device carried by that user makes it possible to lock and unlock these opening elements.

A “hands-free” access system for accessing a motor vehicle allows an authorized user to lock and/or unlock the opening elements of their vehicle without having to physically press buttons on a key. For this purpose, the vehicle identifies a portable device such as a fob or a remote control or even a key carried by the user and, if the fob or the remote control or indeed the key is located in a predetermined area around the vehicle or in the vehicle and is identified as belonging to the vehicle, then the vehicle automatically locks/unlocks its opening elements according to the intention of the user, without the user having to physically manipulate a key.

To this end, when the user approaches the vehicle, communication is established over a wireless communication link between the portable “hands-free” device, for example an electronic fob or a smartphone, and the vehicle function activation device in order to authenticate said portable access device by virtue of its identifier.

Depending on the location of the portable device identified by the vehicle, in said location zones, some actions specific to said location zones are automatically carried out, namely, unlocking/locking or turning on welcome lighting in the passenger compartment in advance.

Nowadays, it is increasingly common to use a cell phone to perform authentication functions, which avoids having to use a dedicated electronic fob and thus limits the number of devices. Therefore, “hands-free” vehicle start-up and/or access systems have needed to be reconfigured in order to be able to also operate with a cell phone equipped with communication standards, such as, for example, ultra-wide band (UWB), or Bluetooth Low Energy® (BLE), or by Wi-Fi (Wireless Fidelity) communication, or else by near-field communication. Ultra-wide band (UWB) is in particular a radio modulation technique which is based on transmitting pulses of very short duration, often of less than a nanosecond. Thus, the bandwidth may reach very large values.

Ultra-wide band communication makes it possible to locate the portable device and authenticate it when said device is in a predetermined area around the vehicle; near-field communication for its part makes it possible to secure access by establishing a very short distance communication between the vehicle and the access device. These two types of communication therefore prove to be necessary and complementary to allow the user to unlock the opening elements of their vehicle securely.

The access device approaching the vicinity of the activation device (less than 2 m away) and the recognition of the identifier received by the computer, in conjunction with the near detection of the access device close to the handle, allows the door to be locked or unlocked.

However, in a door handle, the space allocated to the integration of an elliptical ultra-wide band monopole antenna and a coil for the near-field communication antenna on a vehicle printed circuit board is very limited. And said integration cannot be done without compromise, by reducing the size of one of the two antennas, or even reducing the size of both.

An aspect of the invention therefore proposes a device for activating a vehicle function using near-field communication and ultra-wide band communication that overcomes the drawbacks of the prior art, more precisely allowing space savings compared with the devices of the prior art.

SUMMARY OF THE INVENTION

An aspect of the invention relates to a device for activating a vehicle function in the near field and in the ultra-wide band, intended to be installed on board a motor vehicle, comprising:

a. an antenna consisting of a plurality of discontinuous windings having two junction zones thus forming a first antenna part and a second antenna part, b. near-field communication control means of said antenna which are electrically connected to said antenna, c. first connection means between the windings of the two antenna parts at the junction zones, comprising at least one inductor, the at least one inductor connecting a winding of the first part to a corresponding winding of the second part, d. the near-field communication control means of said antenna and the first connection means and the two antenna parts forming a near-field communication antenna, e. ultra-wide band communication control means of said antenna which are electrically connected to said antenna at a junction point, f. second connection means between the windings of one and the same antenna part, comprising at least one capacitor, the at least one capacitor connecting together two windings of the same first antenna part or of the same second antenna part, g. the control means of said ultra-wide band antenna, the connection means and the two antenna parts forming an ultra-wide band dipole antenna, the activation device being able to communicate in the near field and in the ultra-wide band simultaneously.

Preferentially, the first part and the second part are symmetrical to each other along an axis passing through the junction zones.

Advantageously, the at least one inductor is of an inductance designed for a near-field communication frequency and has an inductance of between 1 nH and 100 nH.

And the at least one capacitor is of a capacitance designed for an ultra-wide band communication frequency and has a capacitance of between 10 pF and 100 pF.

An aspect of the invention also relates to any vehicle door handle, door or motor vehicle, comprising a device according to any one of the features mentioned above.

BRIEF DESCRIPTION OF THE DRAWINGS

Other features and advantages of aspects of the invention will become more clearly apparent on reading the description that follows. This description is purely illustrative and should be read with reference to the attached drawings, in which.

DESCRIPTION OF EXEMPLARY EMBODIMENTS

Figure 1:
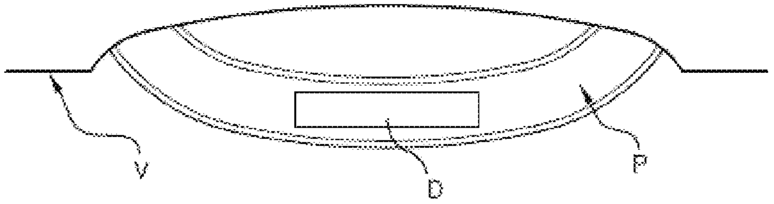
FIG. 1 schematically shows a vehicle door handle comprising an activation device according to an aspect of the invention, FIG. 2 schematically shows an activation device according to an aspect of the invention, FIG. 3 schematically shows the first connection means between the windings of the two antenna parts, FIG. 4 schematically shows the second connection means between the windings of one and the same antenna part.

FIG. 1 shows a door handle P of a motor vehicle V, comprising an activation device D according to an aspect of the invention.

Figure 2:
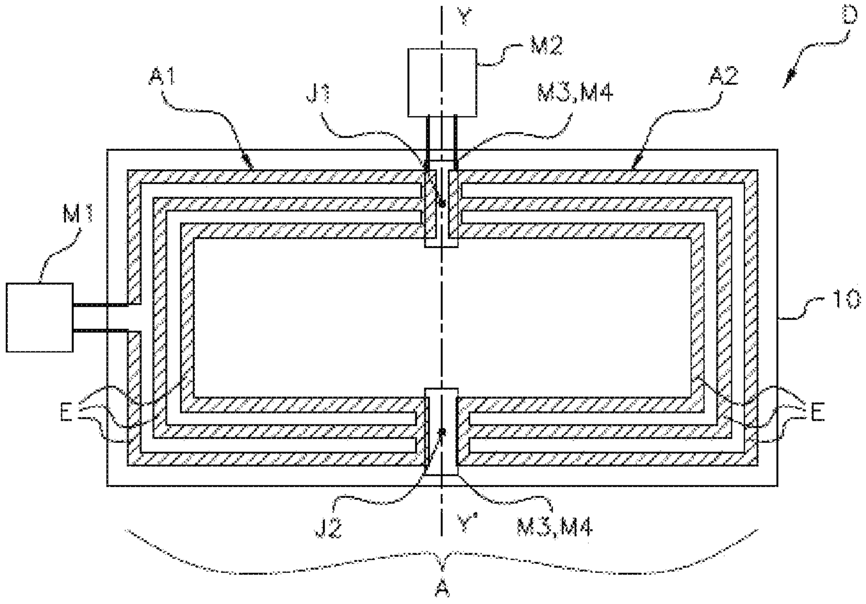
Figure 3:
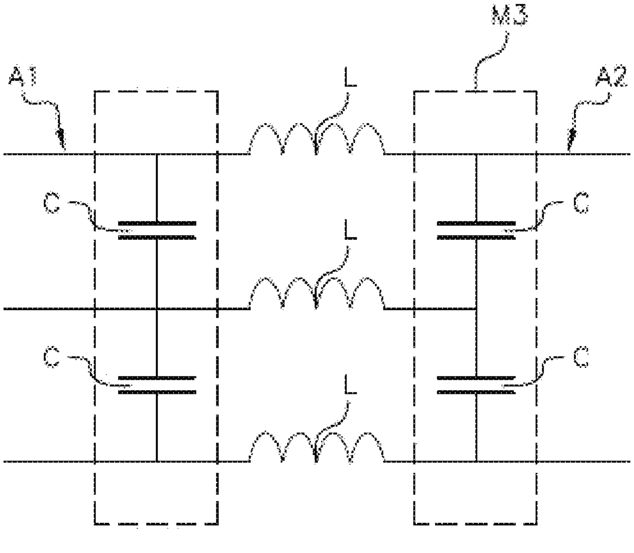
Figure 4:
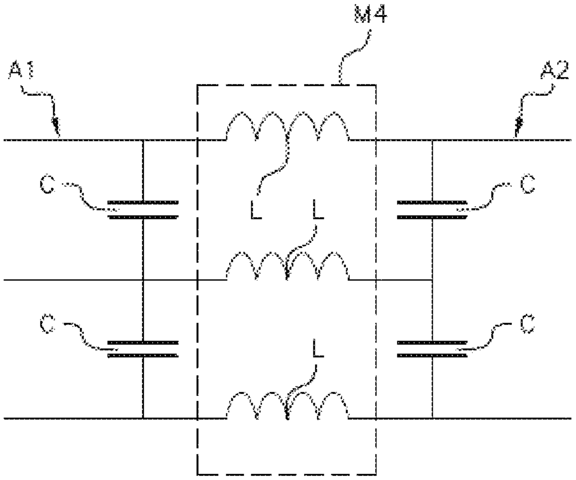

The activation device D according to an aspect of the invention comprises a near-field communication antenna A, consisting of a plurality of windings E, located on a printed circuit board 10 (cf. FIG. 2). Near-field communication is communication at the frequency of 13.56 MHz at a very short distance, of the order of a few tens of centimeters at most, the detection distance generally being between 0 and 10 cm.

An aspect of the invention proposes that said antenna be modified in order to be able to communicate in the ultra-wide band in the form of a dipole antenna, as will be explained below.

Ultra-wide band (UWB) is understood to mean a radio modulation technique which is based on the transmission of pulses with a very short duration, often of less than a nanosecond, and over a wide frequency spectrum. Thus, the bandwidth may reach very large values. UWB is generally considered to need to have a bandwidth-to-center-frequency ratio of at least 20%, or a bandwidth of 250 MHz or more. In the United States, the FCC restricts the use of UWB to a bandwidth-to-center frequency ratio of 20% or more, or to a bandwidth of 500 MHz or more.

The windings E have the particularity according to an aspect of the invention of being discontinuous at two junction zones J1, J2, thus forming two antenna parts, namely, a first part A1 and a second part A2 (cf. FIG. 2).

Preferably, but in no way limiting, as illustrated in FIG. 2, the first part A1 and the second part A2 are symmetrical to each other along an axis YY' passing through the junction zones J1, J2.

The activation device D comprises means M1 for controlling said near-field communication antenna which are electrically connected to said antenna (cf. FIG. 2). The control means M1 comprise an on/off switch of transistor type or an input/output control of a microcontroller interface. This type of control means is known from the prior art.

According to an aspect of the invention, the activation device D also comprises first connection means M4 between the windings D of the two antenna parts A1, A2 at the junction zones J1, J2, comprising at least one inductor L of an inductance designed for the near-field communication frequency, that is to say of an inductance of, for example, between 1 nH and 100 nH.

Each winding E of a first antenna part A1 is electrically connected to a corresponding winding E of the second antenna part A2 via said inductor L.

There is therefore as many inductors L as there are windings of the first antenna part A1 or of the second antenna part A2.

The inductors L thus connect the first antenna part A1 to the second antenna part A2 for each winding E. The inductance of the inductor is such that the current coming from the control means M1 passes through the inductor, thus electrically connecting the two antenna parts A1, A2 to form only a single antenna A at the near-field communication frequency.

The inductance of the inductor L is such that it blocks the flow of current at ultra-wide band communication frequencies.

The activation device D also comprises ultra-wide band communication control means M2 which are electrically connected to the two antenna parts at at least one junction point J1 or J2. The control means M2 comprise an on/off switch of transistor type or an input/output control of a microcontroller interface. This type of control means M2 is known from the prior art.

It should be noted that the near-field communication control means M1 and the ultra-wide band communication control means M2 may be activated simultaneously. The activation device D designed in this way according to an aspect of the invention is able to communicate in the ultra-wide band and in the near field simultaneously.

According to an aspect of the invention, the activation device D comprises second connection means M3 between the windings E of one and the same antenna part A1 or A2, comprising at least one capacitor C of a capacitance designed for an ultra-wide band UWB communication frequency.

Said capacitor C connects together two windings E located close to each other of the same first or second antenna part A1, A2.

Thus, the windings E of the first part A1 (respectively the second part A2) are connected together in pairs via a capacitor C.

The capacitor C has, for example, a capacitance of between 10 pF and a few hundred pF, for example 100 pF.

The control means M2 of said ultra-wide band UWB antenna and the second connection means M3 between the windings of one and the same antenna part form an ultra-wide band dipole antenna.

Specifically, the capacitance of the capacitor C is such that it allows the passage of current at the ultra-wide band UWB communication frequency but blocks the passage of current at the near-field communication NFC frequency.

Of course, the inductors L may have values different from each other and the capacitors C may have values different from each other.

An aspect of the invention is also not limited to two antenna parts A1, A2 symmetrical to each other. An aspect of the invention works even if the two antenna parts A1, A2 are not symmetrical to each other.

It should be noted that the two antennas of different communication frequency produced in this way by means of the activation device according to an aspect of the invention operate simultaneously.

The control means of said near-field communication antenna M1 are activated simultaneously with the ultra-wide band communication control means M2. This makes an aspect of the invention particularly advantageous because there is no delay which would be caused by switching from one communication frequency to another.

The invention is therefore particularly ingenious because it makes it possible to obtain, from a modified near-field communication antenna, an ultra-wide band communication dipole antenna operating simultaneously with the near-field communication antenna.

The invention claimed is:

1. A device for activating a vehicle function in the near field and in the ultra-wide band, intended to be installed on board a motor vehicle, the device comprising:

a) an antenna consisting of a plurality of discontinuous windings having two junction zones thus forming a first antenna part and a second antenna part, each antenna part having respective first and second ends, a first junction zone of the two junction zones formed at the respective first ends of the two antenna parts, and a second junction zone of the two junction zones formed at the respective second ends of the two antenna parts, b) near-field communication control means of said antenna which are electrically connected to said first antenna part, c) first connection means between the windings of the two antenna parts at the second junction zone, comprising at least one inductor, the at least one inductor connecting a winding of the first antenna part to a corresponding winding of the antenna second part, d) the near-field communication control means of said antenna and the first connection means and the two antenna parts forming a near-field communication antenna, e) ultra-wide band communication control means of said antenna which are electrically connected to said antenna at the first junction zone, f) second connection means between the windings of one and the same antenna part, comprising at least one capacitor of capacitance, the at least one capacitor connecting together two windings of the same first antenna part or two windings of the same second antenna part, g) the control means of said ultra-wide band antenna, the connection means and the two antenna parts forming an ultra-wide band dipole antenna, the device being able to communicate in the near field and in the ultra-wide band simultaneously.

2. The device as claimed in claim 1, wherein the first antenna part and the second antenna part are symmetrical to each other along an axis passing through the two junction zones.

3. The device as claimed in claim 2, wherein the at least one inductor is of an inductance designed for a near-field communication frequency and has an inductance of between 1 nH and 100 nH.

4. The device as claimed in claim 1, wherein the at least one inductor is of an inductance designed for a near-field communication frequency and has an inductance of between 1 nH and 100 nH.

5. The device as claimed in claim 1, wherein the at least one capacitor is of a capacitance designed for an ultra-wide band communication frequency and has a capacitance of between 10 pF and 100 pF.

6. A vehicle door handle, comprising the device as claimed in claim 1.

7. A vehicle door, comprising the device as claimed in claim 1.

8. A motor vehicle, comprising the device as claimed in claim 1.

9. The device as claimed in claim 1, wherein the near-field communication control means is connected across a discontinuity of the first antenna part.

* * * * *